(12) United States Patent
Lipton et al.

(10) Patent No.: US 7,805,670 B2
(45) Date of Patent: Sep. 28, 2010

(54) PARTIAL RENDERING OF WEB PAGES

(75) Inventors: Eilon J. Lipton, Bellevue, WA (US); Nikhil Kothari, Sammamish, WA (US); Simon Calvert, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 1061 days.

(21) Appl. No.: 11/305,572

(22) Filed: Dec. 16, 2005

(65) Prior Publication Data

US 2007/0143672 A1 Jun. 21, 2007

(51) Int. Cl.
*G06F 17/00* (2006.01)
(52) U.S. Cl. .................. 715/234; 709/203; 709/219; 715/255
(58) Field of Classification Search ................. 715/234
See application file for complete search history.

(56) References Cited

U.S. PATENT DOCUMENTS

| | | | | |
|---|---|---|---|---|
| 5,745,681 A * | 4/1998 | Levine et al. | ............... | 709/200 |
| 5,754,774 A * | 5/1998 | Bittinger et al. | ............. | 709/203 |
| 5,919,247 A * | 7/1999 | Van Hoff et al. | ............ | 709/217 |
| 5,937,160 A * | 8/1999 | Davis et al. | ................. | 709/203 |
| 5,991,760 A * | 11/1999 | Gauvin et al. | ................. | 707/10 |
| 6,029,175 A * | 2/2000 | Chow et al. | .............. | 707/104.1 |
| 6,041,360 A * | 3/2000 | Himmel et al. | ............. | 709/245 |
| 6,108,637 A * | 8/2000 | Blumenau | ....................... | 705/7 |
| 6,147,687 A * | 11/2000 | Wanderski | ................... | 715/853 |
| 6,205,474 B1 * | 3/2001 | Hurley | ........................ | 709/218 |
| 6,377,957 B1 * | 4/2002 | Jeyaraman | ................... | 707/200 |
| 6,605,120 B1 * | 8/2003 | Fields et al. | ................. | 715/239 |
| 6,738,804 B1 * | 5/2004 | Lo | ............................. | 709/219 |
| 7,051,084 B1 * | 5/2006 | Hayton et al. | ............... | 709/219 |
| 7,152,203 B2 * | 12/2006 | Gao et al. | ................... | 715/240 |
| 7,194,682 B2 * | 3/2007 | Warrington | ................. | 715/229 |
| 7,207,000 B1 * | 4/2007 | Shen et al. | ................... | 715/207 |
| 7,464,381 B1 * | 12/2008 | Nickerson et al. | ........... | 719/311 |
| 2002/0032701 A1 * | 3/2002 | Gao et al. | .................... | 707/513 |
| 2002/0062340 A1 * | 5/2002 | Kloecker et al. | ............ | 709/203 |
| 2002/0091725 A1 * | 7/2002 | Skok | ....................... | 707/501.1 |

(Continued)

OTHER PUBLICATIONS

Document Object Model (DOM) Level 2 Events Specification, Version 1.0, W3C Recommendation, Nov. 13, 2000, pp. 1-26.*

(Continued)

*Primary Examiner*—Doug Hutton
*Assistant Examiner*—Zaida I Marrero
(74) *Attorney, Agent, or Firm*—Workman Nydegger (57) ABSTRACT

The updating of an original version of a Web page without having to download the entire Web page. After accessing an original version of a Web page, a browser client detects that the accessed original version of the Web page is to be updated. The browser client then requests an updated version of the Web page from a page server computing system. Thereupon, the page server determines that only a portion of the updated version of the Web page is to be downloaded to the browser client, identifies that portion, and sends a response to the browser client that includes at least the portions of the Web page that have changed, but less than all of the Web page. The browser client then partially renders the updated version of the Web page using the portions of the Web page provided in the response.

10 Claims, 5 Drawing Sheets

U.S. PATENT DOCUMENTS

| | | | |
|---|---|---|---|
| 2003/0226106 A1* | 12/2003 | McKellar et al. | 715/513 |
| 2004/0215719 A1* | 10/2004 | Altshuler | 709/204 |
| 2005/0108418 A1* | 5/2005 | Bedi et al. | 709/232 |
| 2005/0204047 A1* | 9/2005 | Mitchell et al. | 709/228 |
| 2006/0015763 A1* | 1/2006 | Nakajima | 714/4 |
| 2006/0218223 A1* | 9/2006 | Uchida et al. | 709/201 |
| 2007/0073707 A1* | 3/2007 | Rychener | 707/10 |
| 2007/0078810 A1* | 4/2007 | Hackworth | 707/2 |
| 2007/0226613 A1* | 9/2007 | Tandriono et al. | 715/530 |

OTHER PUBLICATIONS

Document Object Model (DOM) Level 2 HTML Specification, Version 1.0, W3C Recommendation, Jan. 9, 2003, pp. 1-56.*

* cited by examiner

PARTIAL RENDERING OF WEB PAGES

BACKGROUND

Background and Relevant Art

Computing systems have revolutionized the way we work and play. Computing systems come in a wide variety of forms including laptop computers, desktop computers, personal digital assistants, telephones, and even devices that have not been conventionally associated with computing systems such as, for example, refrigerators and automobiles. A computing system may even be networked together with other computing systems to allow for networked applications.

One type of common network application is Web browsing. In Web browsing, one computing system (often referred to as a "browser client") includes thereon browser software (often referred to herein as a "browser") that is capable of rendering Web pages on a display. The user of the browser client directs the browser to go to a particular Web page. In response, the browser issues a network request for the Web page. This is often accomplished through the use of a HyperText Transport Protocol (HTTP) GET request, which includes a Uniform Resource Identifier (URI). Using the URI, the intervening routing computing systems directs the request to the computing system that hosts the Web page (hereinafter also referred to as a "page server").

The Web page may be represented on the page server using, for example, HyperText Markup Language (HTML) code that defines top-level rendering instructions for the Web page. For instance, the top-level rendering instructions may define components such as labels, text boxes, and control objects such as buttons, drop-down lists, radio buttons, calendar objects, and others.

The Web page may also include associated in-line script or cascading style sheets (CSS). Alternatively, script and CSS may only be referenced in the Web page in the HTML, while the script and CSS itself may be external to the Web page at a different URI that is referred in the URI. The Web page may also refer to multimedia content (such as sound, images, and video) which are located external to the Web page at a different URI.

The page server generates the Web page HTML in response to the request if the Web page was not already prepared. The page server then sends the Web page including the HTML code and any in-line script or CSS to the browser client in the HTTP GET response so that the browser client may render the Web page. In addition to the Web page itself, the browser may also download any content that is referenced in the Web page, such as multimedia content, or script or CSS that is not in-line with the Web page itself.

Some Web pages may be updated. For instance, a user may take some action such as clicking on a control button in the page. Furthermore, the server may determine that the Web page is to be updated. In that case, in order to update the Web page, a full request is again made to the page server often in the form of an HTTP POST request that includes any input data that is causing the update to occur such as, for example, content provided within an input box. Even if only part of the Web page is to be updated, the server typically sends the entire Web page back to the browser client in the HTTP POST response.

Since the Web page may potentially be quite large, sending all of the Web page over the network can consume significant network bandwidth. Accordingly, there can be significant latency when requesting a Web page that is to be updated, even if only a small part of the Web page has changed. Furthermore, regardless of whether the Web page is small or large, the updated Web page is an entirely separate and discreet Web page from the viewpoint of the browser and the underlying HTTP protocol. Accordingly, the browser re-renders the Web page entirely. This can cause discontinuity on the display as the browser clears the original Web page to render the updated Web page thereby causing flickering of the display. Also, the browser considers the updated Web page to be a separate Web page. Accordingly, when the user navigates backwards from the updated Web page, the user is often presented with the original Web page, when it is often the Web site prior to even the original Web page to which the user might have expected to navigate.

One conventional mechanism for addressing these problems involves moving some of the logic involved with generating the Web page from the page server to the browser client. However, doing so requires changing the server logic, which can be a complicated process. Furthermore, some logic may not be able to be performed by the client in cases in which access to server data would be required to generate the Web page. Also, the programming model on the browser client may be significantly different than the programming model on the page server. Thus, the logic may not be easily transferable from the page server to the browser client.

BRIEF SUMMARY

Embodiments of the present invention may be operated in a network that includes a browser client computing system and at least one page server computing system that offers at least one Web page. The browser client updates the original version of the Web page without having to download the entire Web page. After accessing an original version of a Web page, the browser client detects that the accessed original version of the Web page is to be updated. The browser client then requests an updated version of the Web page from a page server computing system. Thereupon, the page server determines that only a portion of the updated version of the Web page is to be downloaded to the browser client, identifies that portion, and sends a response to the browser client that includes the portions of the Web page that have changed. The browser client then partially renders the updated version of the Web page using the portions of the Web page provided in the response.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Embodiments of the present invention extend to the partial updating of a Web page, rather than updating the entire Web page. First, an example computing system in which features of the present invention may operate will be described with respect to FIG. 1. Then, embodiments of the present invention will be described in further detail with respect to FIG. 2 and subsequent drawings.

Figure 1:
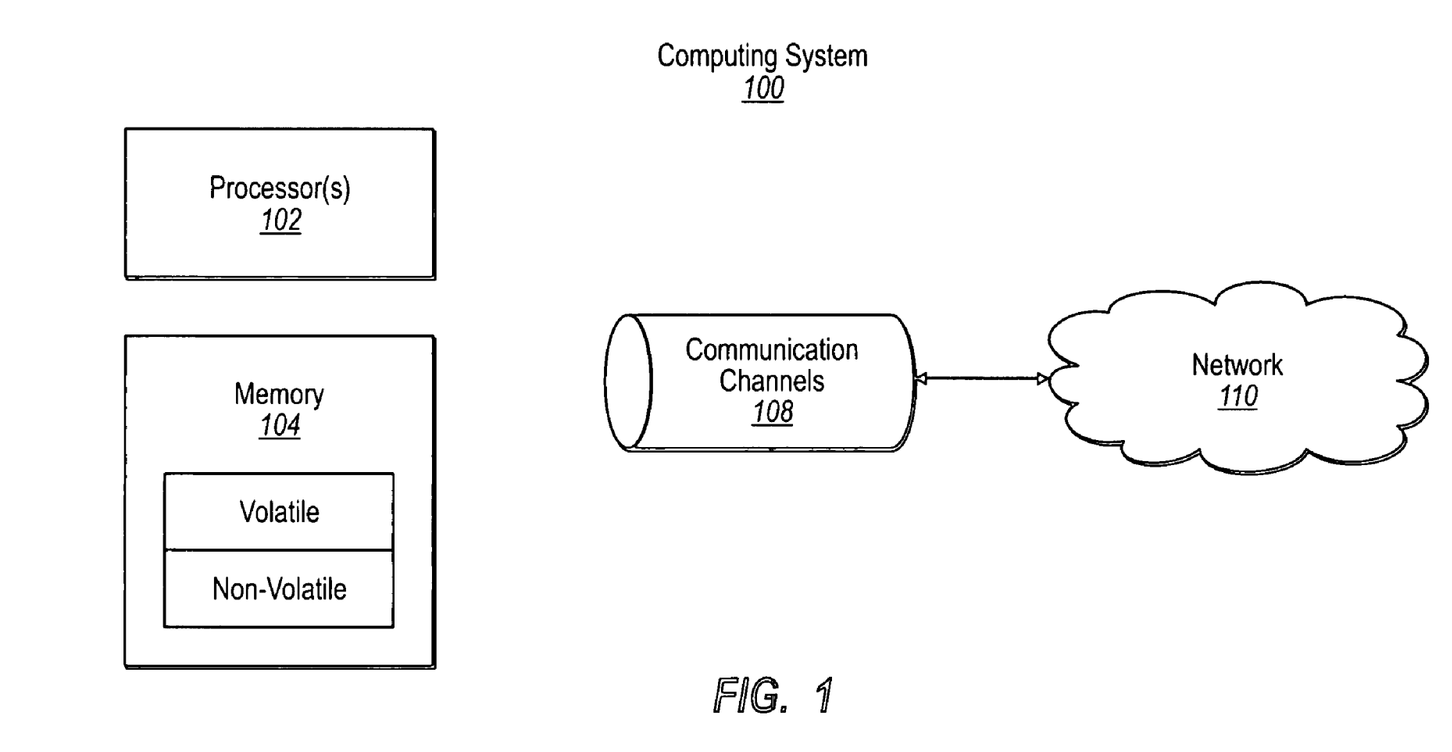
FIG. 1 schematically illustrates a suitable computing environment that may implement features of the present invention.

The embodiments of the present invention may comprise a special purpose or general-purpose computer including various computer hardware, as discussed in greater detail below. FIG. 1 shows a schematic diagram of an example computing system 100 that may be used to implement features of the present invention. The described computing system is only one example of such a suitable computing system and is not intended to suggest any limitation as to the scope of use or functionality of the invention. Neither should the invention be interpreted as having any dependency or requirement relating to any one or combination of components illustrated in FIG. 1.

Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

Referring to FIG. 1, in its most basic configuration, a computing system 100 typically includes at least one processing unit 102 and memory 104. The memory 104 may be system memory, which may be volatile, non-volatile, or some combination of the two. An example of volatile memory includes Random Access Memory (RAM). Examples of non-volatile memory include Read Only Memory (ROM), flash memory, or the like. The term "memory" may also be used herein to refer to non-volatile mass storage such as physical storage media. Such storage may be removable or non-removable, and may include (but is not limited to) PCMCIA cards, magnetic and optical disks, magnetic tape, and the like.

As used herein, the term "module" or "component" can refer to software objects or routines that execute on the computing system. The different components, modules, engines, and services described herein may be implemented as objects or processes that execute on the computing system (e.g., as separate threads). While the system and methods described herein may be implemented in software, implementations in hardware, and in combinations of software and hardware are also possible and contemplated.

In the description that follows, embodiments of the invention are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100.

Computing system 100 may also contain communication channels 108 that allow the computing system 100 to communicate with other computing systems over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise communication media or computer storage media. Computer storage media may comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as communication medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Figure 2:
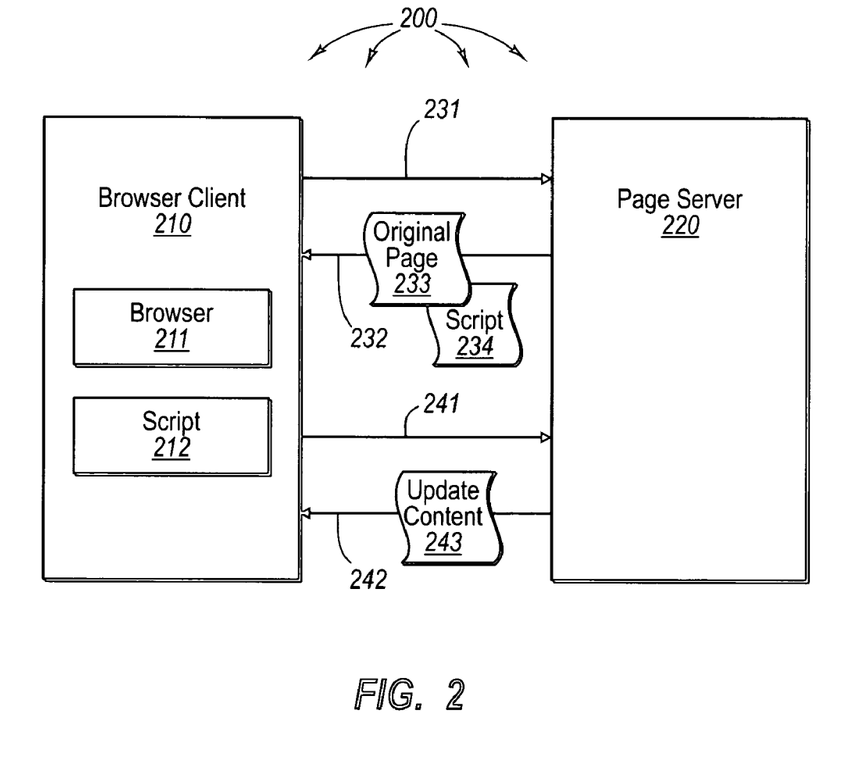
FIG. 2 schematically illustrates a network environment in which embodiments of the present invention may operate.

FIG. 2 illustrates a network environment 200 that includes a browser client computing system 210 (hereinafter also referred to as "browser client") and at least one page server computing system 220 (hereinafter also referred to as "page server"). The page server 220 includes a Web page in the sense that the page server 220 either accesses a pre-generated Web page or may generate the Web page in response to a request for the Web page. The browser client 210 and the page server 220 may each be structured as described above for the computing system 100 of FIG. 1.

In one embodiment, the Web page may include markup language such as HyperText Markup Language (HTML). The markup language may include in-line representations of script and Cascading Style Sheets (CSS). However, the Web page may include internal representations to one or more items external to the Web page and that are represented at a different Uniform Resource Identifier (URI) as compared to the Web page itself.

Figure 3:
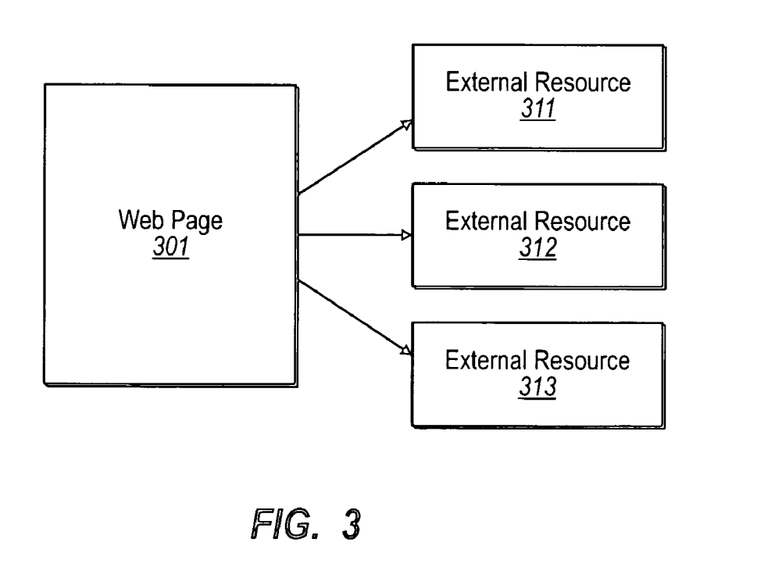
FIG. 3 schematically illustrates a Web page and several external components referenced by the Web page.

FIG. 3 schematically illustrates this relationship including a Web page 301 that refers to a number of external resources 311, 312 and 313. Such external resources may include script, CSS, or multimedia content (such as images, sound and/or video). In this description an in the claims, a Web page is defined as any markup language that is identified at a Uniform Resource Identifier (URI) associated with the Web page and thus includes any content (such as script or CSS) that is in-line with the markup language of the Web page, and explicitly does not include any content that is only referred to within the markup language of the Web page, but which is located at a different URI than the Web page.

Figure 4:
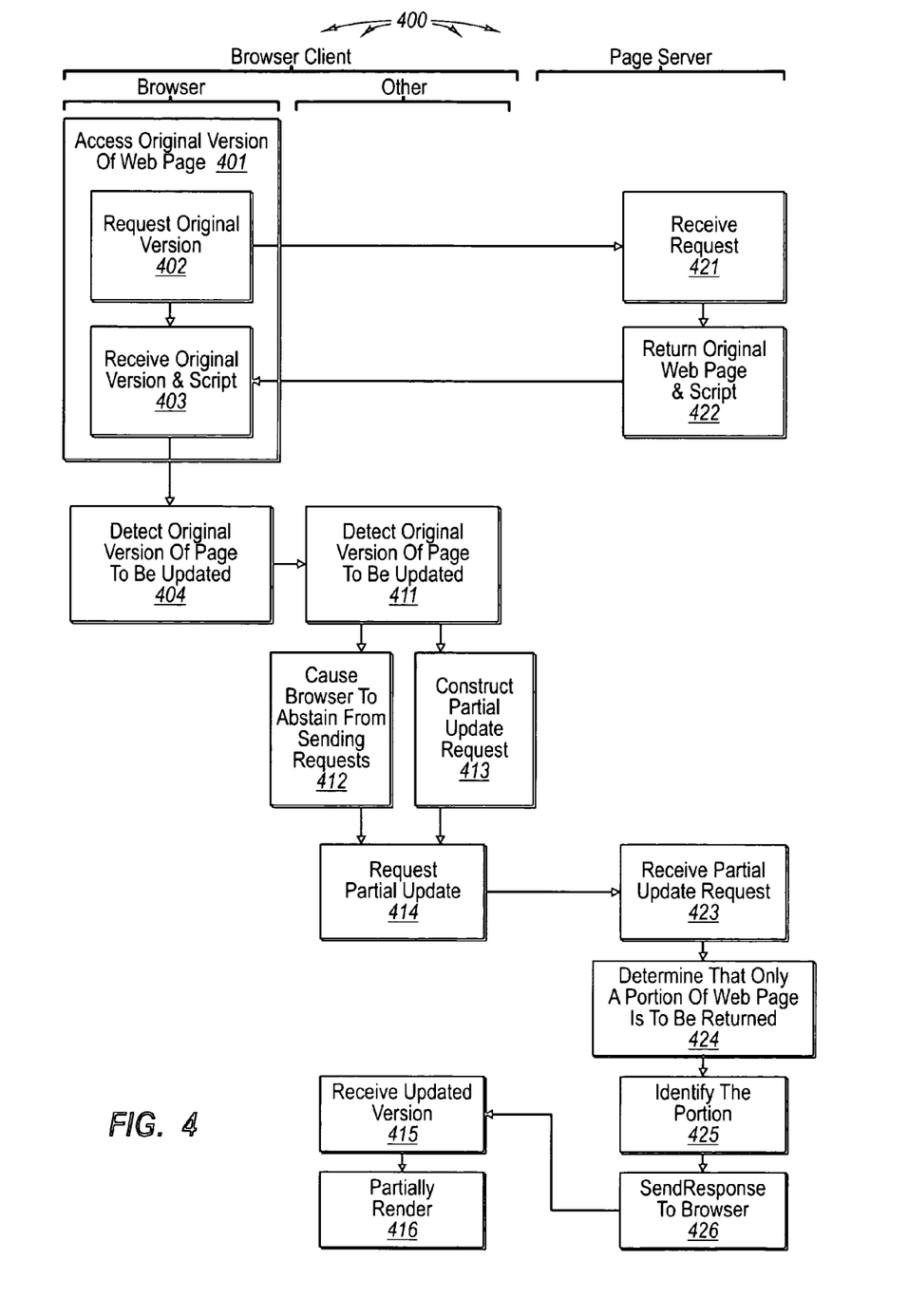
FIG. 4 illustrates a flowchart of a method for partially rendering a Web page in accordance with the principles of the present invention.

FIG. 4 illustrates a flowchart of a method for updating an original version of the Web page without having to download the entire Web page. Some of the acts of FIG. 4 may be performed by a browser client (such as the browser client 210 of FIG. 2) as illustrated in the left and middle columns of FIG. 4 under the general heading "Browser Client". Other acts of FIG. 4 may be performed by a page server (such as the page server 220 of FIG. 2) as illustrated in the right column of FIG. 4 under the heading "Page Server". Furthermore, of those acts performed by the browser client, some of the acts may be performed by a browser (such as browser 211 of FIG. 2) of the browser client as represented in the left column under the specific heading "Browser". Finally, of those acts performed by the browser client, some of the acts may be performed by software external to the browser (such as script 212 of FIG. 2) of the browser client as represented in the right column under the specific heading "Other". In one embodiment, however, the acts attributed under "Other" may be performed by the browser, but under the direction of external code such as script.

Referring back to FIG. 4, the browser accesses an original version of a Web page (act 401). In this description and in the claims, an "original version" of a Web page does not imply that there were not any prior versions of the Web page that were not also accessed by the browser client. It simply means with respect to the flow illustrated in FIG. 2, the original Web page is the first version of the Web page that is accessed by the browser client.

The browser client may access the original version of the Web page in a variety of ways. For instance, the browser client may have the original version of the Web page stored locally, perhaps due to a prior download of the Web page from some page server. The original version of the Web page may have been from a different page server than the Web page that downloads the updated version of the Web page.

However, in the illustrated embodiments of FIGS. 2 and 4, the browser accesses the original version of the Web page by requesting the original version of the Web page from the page server (act 402) as also represented in FIG. 2 using arrow 231 in which the browser client 210 sends a request to the page server 220. The page server receives the request (act 421) and returns the original version of the Web page (act 422). Thereupon, the browser receives the original version of the Web page (act 403) in its entirety from the page server in response to the request. For instance, in FIG. 2, the page server 220 sends the original version of the Web page 223 back to the browser client 210 as represented by arrow 232. An example of the request 231 may be an HTTP GET request, whereas an example of the response 232 may be an HTTP GET response.

Additionally, the page server 220 downloads computer-executable instructions illustrated as script 234. Although these computer-executable instructions need not be script, the use of script is particular helpful in some cases in that script may be included in-line with the markup language of the original version of the Web page, and is commonly used in Web pages. Accordingly, the computer-executable instructions may also be referred to herein as "partial update script" even though such script may need not actually be drafted in accordance with any script language. The "partial update script" as referred to herein may even be binary, and need not be included in the Web page itself, but may be downloaded separately.

There may be cases in which the browser client 210 already includes partial update script or some other computer-executable instructions (represented by script 212) that is capable of accomplishing the functions described below as being performed by the partial update script. However, the flexibility to provide partial update script 234 along with the original Web page in helpful for supporting partial update of Web pages in the context of browser clients 210 that do not already have the described functionality attributed herein to the partial update script 234.

The browser then detects that the original version of the Web page is to be updated (act 404). For instance, the browser may detect that a "submit" button has been selected by a user after inserting text into a text box. For instance, suppose that the original version of the Web page is a search page that includes three elements as illustrated by the example Web page 600 of FIG. 6. Specifically, the Web page includes an input text box 601 into which a user may insert search input, a submit button 602 that the user may select to instruct a search to begin on the input provided in the input text box, and a list 603 in which the search results are populated. If the user were to insert search input into the text box 601 and select the search button 602, the browser would automatically detect that the Web page is about to be updated.

The partial update script is configured to detecting when the browser has detected an event that would normally cause the browser to request an updated version of a Web page (act 411). For instance, the partial update script may call into an interface offered by the browser that causes the partial update script to be notified when a submit button is activated. For example, an Internet Explorer browser offers a Dynamic Object Model (DOM) interface that allows for such a function call, although other browsers may offer interfaces that permit the same.

In response, the partial update script instructs the browser to abstain from requesting the updated version of the Web page (act 412). The DOM interface may provide such a function call although other browsers may do the same. In one embodiment described in further detail herein, from the standpoint of the browser, the page update request has been cancelled. In that case, the rest of the partial rendering process is under the control of the partial render script.

Figure 6:
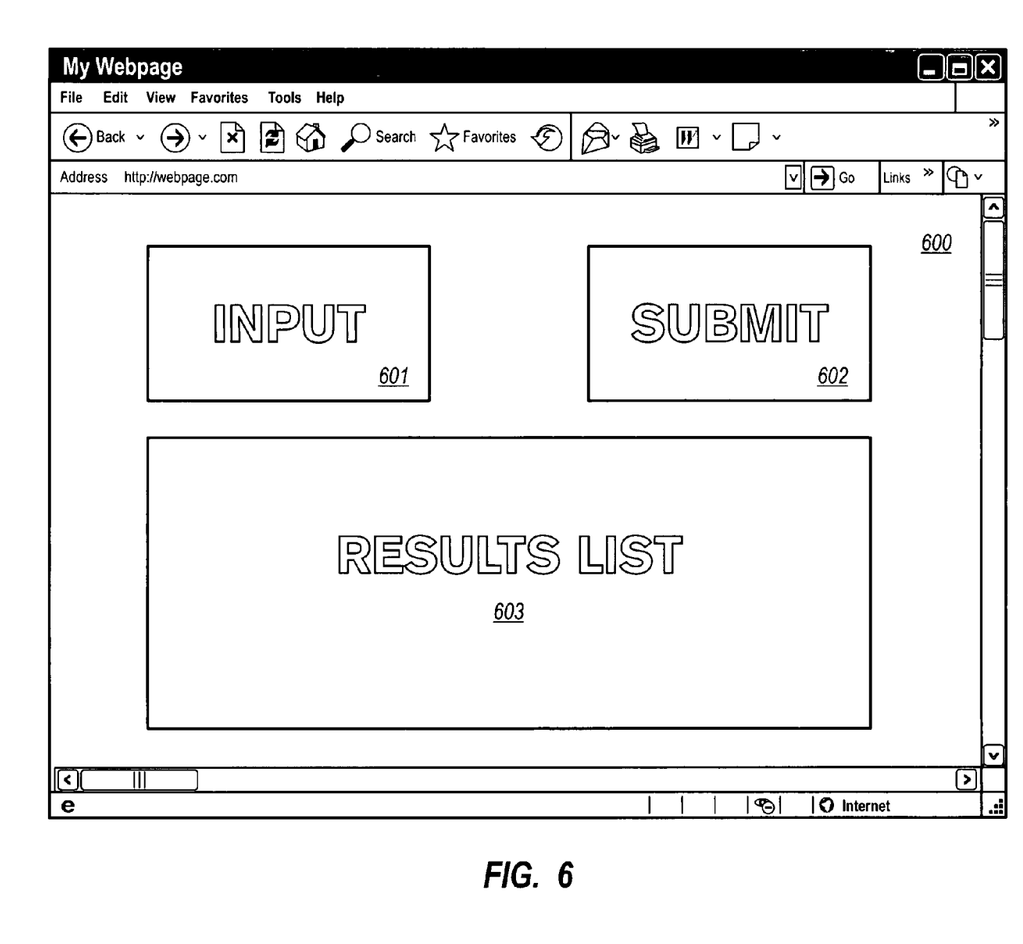
FIG. 6 illustrates an example rendering of a basic Web page used to describe features of the present invention.

Particularly, the partial render script constructs a request for an incremental updated version of the Web page (act 413). The request includes an indication that the entire updated version of the Web page is not being requested. Instead, the request indicates that less than all of the entire Web page is acceptable so long as those portions of the Web page that have changed are downloaded. For instance, in the example in which a search page includes an input text box, a submit button, and a list, it is not necessary to receive rendering instructions for each of these items again. It is only the search results lists that will change. Accordingly, the response to the partial update request would include the search results list to be rendered as an updated to the list portion 603, but perhaps may not include a re-representation of the input text box 601 or the submit button 602.

In one embodiment, the partial update request is similar to an HTTP POST request that might have been issued by the browser. Additionally, however, the partial update script may include some indication that the request is for a partial update. For instance, the partial update script may include a custom partial update header that indicates that the request is for only a partial update of the Web page, and not for the entire Web page represented at the corresponding URI. Conventional HTTP protocol permits custom headers to be included in HTTP POST requests.

The partial update script then requests the updated version of the Web page from the page server (act 414). For instance, referring to FIG. 2, the script 212 or 234 may cause such a request to be transmitted to the page server 220 as represented by arrow 241.

The page server receives the request for an updated version of a Web page from the browser client (act 423). The page server then determines that only a portion of the updated version of the Web page is to be downloaded to the browser client in response to the request (act 424) wherein the portion includes at least any components of the Web page that have changed since a prior version of the Web page, but includes less than all of the components of the Web page. In one embodiment, some portions of the Web page may always be downloaded to the browser client even as part of a partial update request. Such portions may include, for example, the title of the Web page, any associated script and CSS, and one or more other components of the Web page whether or not in the form of markup language. For instance, the rendering instructions for the other components may be represented as HTML fragments, or may be non-markup language-based rendering instructions such as, for example, script.

The page server may make this determination by relying exclusively on the partial update request 241 itself. Alternatively or in addition, however, the page server may make this determination based on information outside of the partial update request. In cases where the determination is made exclusively based on information outside of the update request, the request 241 need not have an indication that the request is for a partial update.

The page server then identifies the portions that are to be included in the response to the request (act 425). This may be accomplished in numerous different ways. One possible is to identify default portions that are to be included in the response. For example, the server that provides the search page may identify that the title, script and CSS associated with the page may always be downloaded. As for the other components (such as the text box 601, submit button 602 and list 603), the server may have the capability to identify which of those components may, by default, be downloaded to any browser clients to which a partial update is to be sent. In the example of the search Web page 600, the page server may identify that the results list component 603 is always to be updated, but the input text box 601 and the submit button 602 are not to be updated as a default. After all, it is the very nature of a search Web page that the results list will change. The default components may be identified by including an attribute in the associated markup language for that component or perhaps by consulting a separate record.

Additionally or in the alternative, the Web page may have components that are conditionally to be updated. For instance, in the search Web page 600 example, it may not always be appropriate for even the search results list 603 to be updated. For instance, if there was no new text inputted into the input text box 601, then updating the search results list 603 would not result in any change to the search results list. Thus, the search results list 603 may be conditionally updated depending on whether or not there is new text inputted into the input text box. Conditional updating may be handled in different ways on the page server.

In one embodiment, there is server side code that detects when an event is triggered (e.g., new text in the input text box), the event handler then may identify any conditionally updated components whose conditions depend on that event. Another event may be that the Web page developer marks the component as "stale", thus prompting the page server to send the rendering instructions (either in markup or other instructions such as script) the next time the Web page is updated.

Alternatively, a trigger may be included in each conditional component. For instance, the search results list component may have a trigger that fires when new text is inputted into the input text box. When the trigger is fired for a particular conditional component, that component is marked as "stale" meaning that the component should be updated.

Figure 5:
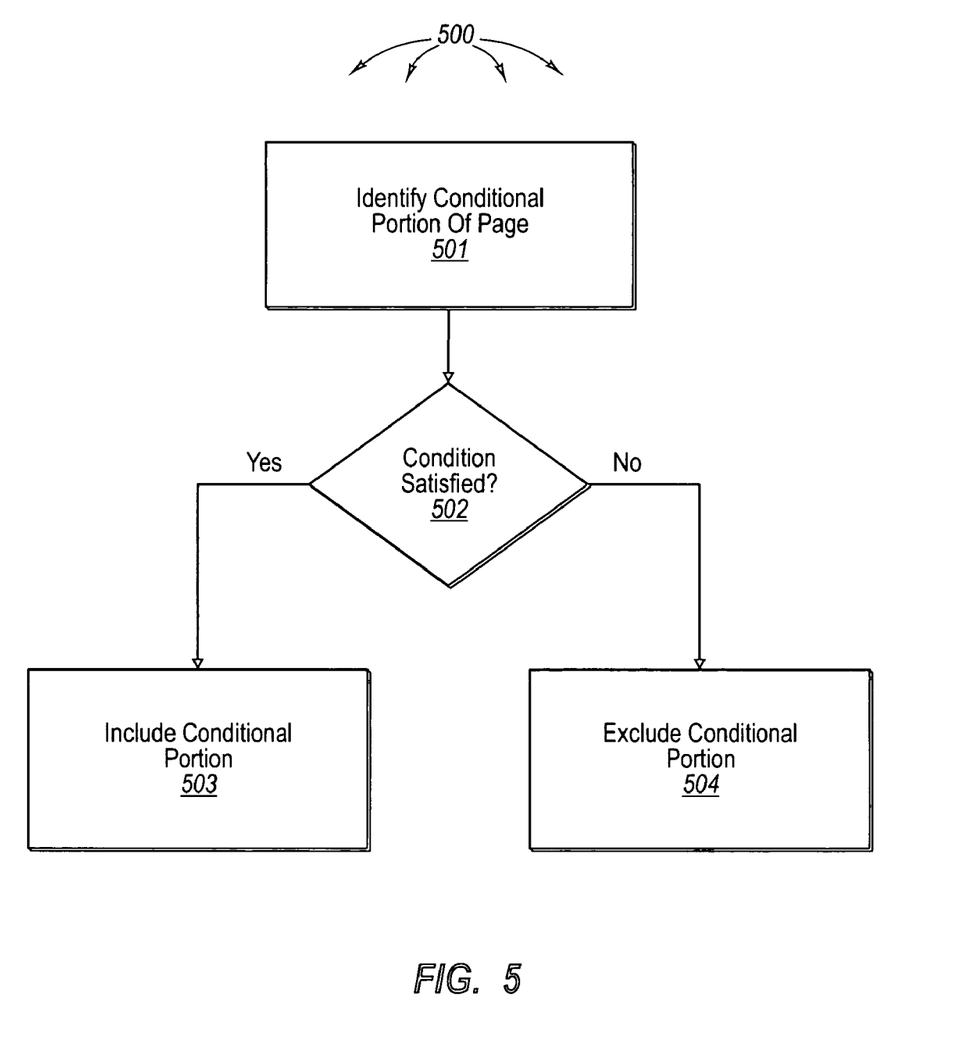
FIG. 5 illustrates a flowchart of a method for identifying conditional portions to be downloaded to the browser client as part of the partial update in accordance with embodiments of the present invention.

FIG. 5 illustrates a flowchart of a method 500 for identifying whether or not to update a conditional component in accordance with one aspect of the present invention. The method 500 may be initiated upon identifying a conditional portion that may be included in the response depending upon the satisfaction of a corresponding set of one or more conditions (501). It is then determined (e.g., through event handling code or embedded triggers or the like) whether or not the corresponding set of one or more conditions is satisfied (decision block 502). If the one or more conditions have been satisfied (Yes in decision block 502), then the conditional portion is represented in the response (act 503). Otherwise (No in decision block 502), then the conditional portion is not represented in the response (act 504).

As a further alternative, whether or not the component is default updated or conditionally updated, rather than sending markup language representing the entire component to be updated, the server may actually generate script to accomplish the update. This may save network bandwidth in cases in which the component to be updated is complex and the changes to the component are relatively minor. For instance, suppose the component to be updated is a calendar object, which is quite elaborate when represented in markup language. Now suppose that the only change to the calendar component is to highlight one day on one of the days of the calendar in month view. A few lines of script may be all that is required to perform the update. The server may provide an Application Program Interface (API) to a server generation component that generates script or other computer-executable instructions that may perform the component update.

Upon generating the appropriate partial update response, the page server sends the partial update response to the browser client. For instance, in FIG. 2, the page server 220 sends 242 the update content 243 to the browser client 210. The browser client receives the updated version of the Web page (act 415). Recall that the updated version of the Web page (e.g., updated content 243) includes at least any components of the Web page that have changed between the original and updated versions of the Web page, but includes less than all of the components of the Web page.

The partial update script may then render the updated version of the Web page without re-rendering the entire Web page (act 416). For instance, the convention DOM interface provided by the Internet Explorer browser allows for script to render components of a Web page, and permits for replacement markup language. Other browsers may have interfaces that do the same.

Embodiments of the present invention provide significant advantages over a full re-rendering of the Web page when the page is updated. For instance, when the browser request for an updated Web page is cancelled, and the rest of the process occurs outside of the browser, or by the browser but under the direction of external code such as script. In this manner, the browser's navigation logic is unaware that an update occurred. Thus, navigating backwards from the updated Web page will not result in the original Web page being rendered, but the Web page prior to that Web page being updated. This may be more consistent with user expectations in many cases.

Furthermore, since the entire Web page is not re-rendered, the screen is not cleared and re-rendered, thereby reducing or eliminating the flickering associated with a full re-rendered. Furthermore, since the partial update response may be much smaller potentially then a full update response, network bandwidth and server processing resources are conserved thereby reducing latency. Thus, the user browsing experience may potentially be improved.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a network that includes a browser client computing system and at least one page server computing system that offers at least one Web page, a method for the browser client to update an original version of the Web page without having to download the entire Web page, the method comprising:
    an act of a browser on the browser client computing system requesting an original version of a Web page from the page server computing system;
    an act of the browser receiving the original version of the Web page in its entirety from the page server computing system in response to the act of requesting the original version of the Web page, the original version of the Web page including a partial update script;
    an act of the browser displaying the original version of the Web page;
    an act of the partial update script registering with the browser to be notified when user input to the browser invokes functionality of the Web page that instructs the browser to request an update to the original version of the Web page that would cause the entire Web page to be reloaded;
    an act of the browser receiving input that invokes the functionality of the Web page that instructs the browser to request an update to the original version of the Web page that would cause the entire Web page to be reloaded;
    an act of the browser notifying the partial update script of the request to update the original version of the Web page;
    an act of the partial update script receiving the notification;
    an act of the partial update script preventing the browser from requesting the update;
    after preventing the browser from requesting the update, an act of the partial update script requesting a partial updated version of the Web page from the page server computing system;
    an act of receiving the partial updated version of the Web page from the page server computing system in response to the act of requesting the partial updated version of the Web page, wherein the partial updated version of the Web page includes at least any components of the Web page that have changed between the original and partial updated versions of the Web page, but includes less than all of the components of the Web page; and
    an act of partially rendering the partial updated version of the Web page without re-rendering the entire Web page.

2. A method in accordance with claim 1, wherein the Web page includes markup language.

3. A method in accordance with claim 1, wherein the Web page also includes content that is included in-line with the markup language, but does not include content that is only referred to in the markup language.

4. A method in accordance with claim 1, wherein the components of the Web page that have changed are represented in the response using markup language, wherein the act of partially rendering comprise an act of rendering using the markup language.

5. A method in accordance with claim 1, wherein the components of the Web page that have changed are represented in the response using script, wherein the act of partially rendering comprise an act of executing the script.

6. A method in accordance with claim 1, wherein the act of the partial update script requesting a partial updated version of the Web page from the page server computing system comprises:
    generating an HTTP POST request and including a custom partial update header in the request that indicates to the page server computing system that the request is for a partial update of the Web page rather than for an update to the entire Web page.

7. A method in accordance with claim 1, further comprising:
    an act of the browser receiving input into one or more fields of the Web page; and
    in response to the input, an act of the browser sending events to the page server computing system indicating that input has been received into the one or more fields of the Web page, wherein upon the partial update script requesting the partial updated version of the Web page, the page server computing system uses the received events to determine which portions of the Web page are to be updated.

8. A computer program product for use in a network that includes a browser client computing system and at least one page server computing system that offers at least one Web page, the computer program product comprising one or more computer storage media having thereon computer-executable instructions that, when executed by one or more processors of the browser client computing system, cause the browser client computing system to perform the following:
    an act of a browser on the browser client computing system requesting an original version of a Web page from the page server computing system;
    an act of the browser receiving the original version of the Web page in its entirety from the page server computing system in response to the act of requesting the original version of the Web page, the original version of the Web page including a partial update script;

an act of the browser displaying the original version of the Web page;

an act of the partial update script registering with the browser to be notified when user input to the browser invokes functionality of the Web page that instructs the browser to request an update to the original version of the Web page that would cause the entire Web page to be reloaded;

an act of the browser receiving input that invokes the functionality of the Web page that instructs the browser to request an update to the original version of the Web page that would cause the entire Web page to be reloaded;

an act of the browser notifying the partial update script of the request to update the original version of the Web; page;

an act of the partial update script receiving the notification;

an act of the partial update script preventing the browser from requesting the update;

after preventing the browser from requesting the update, an act of the partial update script requesting a partial updated version of the Web page from the page server computing system;

an act of receiving the partial updated version of the Web page from the page server computing system in response to the act of requesting the partial updated version of the Web page, wherein the partial updated version of the Web page includes at least any components of the Web page that have changed between the original and partial updated versions of the Web page, but includes less than all of the components of the Web page; and an act of partially rendering the partial updated version of the Web page without re-rendering the entire Web page.

9. A computer program product in accordance with claim 8, wherein the Web page includes markup language.

10. A computer program product in accordance with claim 9, wherein the partial updated version of the Web page includes script.

* * * * *

UNITED STATES PATENT AND TRADEMARK OFFICE
CERTIFICATE OF CORRECTION

| | | |
|---|---|---|
| PATENT NO. | : 7,805,670 B2 | |
| APPLICATION NO. | : 11/305572 | |
| DATED | : September 28, 2010 | |
| INVENTOR(S) | : Eilon J. Lipton et al. | |

It is certified that error appears in the above-identified patent and that said Letters Patent is hereby corrected as shown below:

In column 4, line 39, before "store" delete "carry or".

In column 4, line 46, after "as" insert -- a --.

In column 11, line 16, in Claim 8, delete "Web;" and insert -- Web --, therefor.

Signed and Sealed this
Tenth Day of May, 2011

David J. Kappos
*Director of the United States Patent and Trademark Office*